United States Patent [19]
Köllmann

[11] Patent Number: 5,842,889
[45] Date of Patent: *Dec. 1, 1998

[54] UNLOCKING DEVICE FOR A LOCK FASTENING OF ELECTRICAL CLAMPS, MODULES, INSTALLATION DEVICES OR THE LIKE ON ASSEMBLY RAILS

[75] Inventor: Hans Josef Köllmann, Minden, Germany

[73] Assignee: Wago Verwaltungsgesellschaft mbH, Minden, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 594,985

[22] Filed: Jan. 31, 1996

[30] Foreign Application Priority Data

Feb. 4, 1995 [DE] Germany ......................... 195 04 762.1

[51] Int. Cl.$^6$ ..................................................... H01R 9/26
[52] U.S. Cl. .............................................................. 439/716
[58] Field of Search ..................................... 439/716–725

[56] References Cited

U.S. PATENT DOCUMENTS 4,269,471 5/1981 Woertz ..................................... 439/716

FOREIGN PATENT DOCUMENTS

| 0 326 624 | 8/1989 | European Pat. Off. . | |
| 0628467 | 2/1982 | Switzerland ........................... | 439/716 |
| 1 410 578 | 10/1975 | United Kingdom . | |
| 1410578 | 10/1975 | United Kingdom ................... | 439/716 |

*Primary Examiner*—Hien Vu
*Attorney, Agent, or Firm*—Salter & Michaelson

[57] ABSTRACT

The invention concerns an unlocking device for a lock fastening of clamps, modules, installation devices or the like on hat-shaped assembly rails. It is provided to use a bracing piece on the underside of the corresponding insulating material housing, which saves space in its rest position and is arched out toward the bottom into the free inside space of the assembly rail and whose back is pulled toward the top in its operating position by means of a pulling rod and in this way with its two ends, simultaneously and in opposite directions, presses out the locking feet of the lock fastening from the outer flange edges of the assembly rail.

3 Claims, 2 Drawing Sheets

UNLOCKING DEVICE FOR A LOCK FASTENING OF ELECTRICAL CLAMPS, MODULES, INSTALLATION DEVICES OR THE LIKE ON ASSEMBLY RAILS

BACKGROUND OF THE INVENTION

The invention concerns an unlocking device for a lock fastening by means of which the insulating material housing of electrical clamps, modules, installation devices or the like, can be locked onto an assembly rail, hat-shaped in cross section, whereby the lock fastening comprises two spring-yielding locking feet, which are shaped on the underside of the insulating material housing, and each of which will be locked from outside onto the outer flange edges of the assembly rail. For unlocking, both feet are pressed out, simultaneously and in opposite directions by means of a mechanically actuatable unlocking device.

Unlocking devices of this type have the general advantage that corresponding clamps, modules, installation devices, or the like can be locked onto assembly rails in a perpendicular manner and can be again removed perpendicularly from the assembly rail without the necessity of a lateral tipping or turning motion of the corresponding clamps or of the device around an outer flange edge of the assembly rail for this purpose. The latter could not be accomplished directly with overwide clamps or devices, since in flatly constructed assembly rails, a tight or dense arrangement of the clamps or devices is present, or the necessary tipping and turning space is not present next to the assembly rails.

In the case of a known unlocking device according to EP 0 326,624 A1, it is provided to incorporate two flat slide pieces in the lower part of the insulating material housing of the corresponding clamps or devices, and these pieces are extended crosswise over the assembly rails up to the outer lateral edge of the insulating material housing, and they are coupled in a counter-movement manner by means of a rotating joint [hinge] common to both slide pieces, so that when only one of the slide pieces is actuated, both slide pieces simultaneously press out the locking feet from the outer flange edges of the assembly rails.

This is an unlocking device that is relatively expensive mechanically and for this reason is sensitive to disruption. In addition, the slide pieces require additional space in the structural space above the assembly rail. And finally, the actuation of the slide pieces on the outer sides of the insulating material housing is not always possible, i.e., if, e.g., installation devices are mounted on assembly rails parallel to one another in a tight arrangement.

The task of the invention is to propose a new unlocking device of the type defined above for the lock fastening of clamps, modules, installation devices or the like on hat-shaped assembly rails, which is reliable in its function and saves space and also can still be actuated when there is a dense arrangement of the clamps, modules, installation devices or the like.

SUMMARY OF THE INVENTION

This task is resolved according to the invention in that the unlocking device comprises a bracing piece, which is arranged on the underside of the insulating material housing and with the back of the piece arching out from the underside of the insulating material housing extends between the flanges into the free inside space of the assembly rail, whereby the bracing piece in its position of rest has a greater arch, so that its ends do not load the locking feet, and has a flatter arch or no arch in its operating position, such that in the operating position, the ends of the bracing piece press the locking feet out from the outer flange edges of the assembly rail, and that the bracing piece can be moved from its rest position to its operating position by means of a pulling element engaged on the back of the piece.

The pulling element according to the invention operates against the restoring forces of the bracing piece, which are determined either from the piece itself (e.g., in the case of a bending-elastic spring piece) and/or by the restoring forces of the spring locking feet, and has the advantage that the pulling forces exercised manually on the pulling element may be increased if necessary without anything further, in order to be able to undertake an actuation that is functionally reliable, i.e., unlocking the lock mechanism even after several years of incorporation of the clamps, devices, or the like, e.g., in a switch cabinet.

The unlocking device also saves a great deal of space according to the instructions of the invention, since the bracing piece arched out from the underside of the insulating material housing in the rest state is extended by its back into the free inside space of the assembly rail and optimally utilizes this space.

The pulling element according to the invention may be constructed in various forms of embodiment. The simplest would be a Bowden control, which can be displaced through the insulating material housing on its upper side and always remains accessible from the top, even when the corresponding clamps, modules, insulation devices or the like are locked in a tight arrangement next to one another on assembly rails.

An appropriate form of embodiment of the invention provides that the pulling element is configured in the form of a pulling bar of insulating material, which is passed laterally at or through the insulation material housing to the upper side of the clamp of the module, the installation device, or the like.

Thus, according to a further form of embodiment of the invention, it is advantageous to arrange the pulling bar with its upper engaging end in the surface of the clamp, the module, the installation device or the like in a recessed position, and to incorporate a free path in the pulling rod or between the pulling rod and the bracing piece for pulling out the gripping end from the recess, such that pulling forces exercised on the pulling rod move the bracing piece from its rest position into its operating position only when the end of the free path has been reached.

BRIEF DESCRIPTION OF THE DRAWINGS

An example of embodiment of the invention will be described in more detail below on the basis of the drawings. Here.

DETAILED DESCRIPTION OF THE PREFERRED EMBODIMENT

A simplified, box-shaped insulating material housing 6 is shown in the figures, and this can be the housing of a clamp, a module, an installation device or the like.

Figure 2:
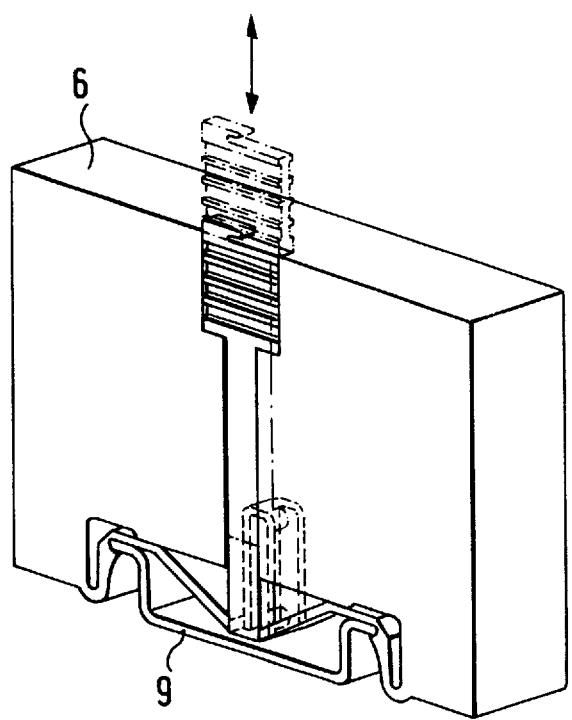

Two spring-yielding locking feet 7 and 8 are shaped on the underside of the insulating material housing 6, and these each lock onto the outer flange edges of the assembly rail 9 from the outside, as is shown in FIG. 2.

For unlocking, these two locking feet must be pressed out simultaneously and in opposite directions from the outer flange edges of assembly rail 9. For this purpose, a bracing piece or actuator is provided with two ends or fingers 10 and 11, which arches out on the back of the piece from the underside of insulating material housing 6 and extends into the free inside space of assembly rail 9 (see FIG. 2).

In the case of the embodiment that is shown, a vertically extending free path-collecting unit or retention member provided within the apex of the bracing piece back, the retention member being central and symmetrical to the two ends 10 and 11. The retention member 12 is joined rigidly with ends or fingers 10 and 11, but can be shifted vertically into insulating material housing 6. Further, in the example of embodiment that is shown, ends or fingers 10 and 11 of the actuator are made of insulating material, and each is shaped with its outer and directly on locking feet 7 and 8.

Figure 1:
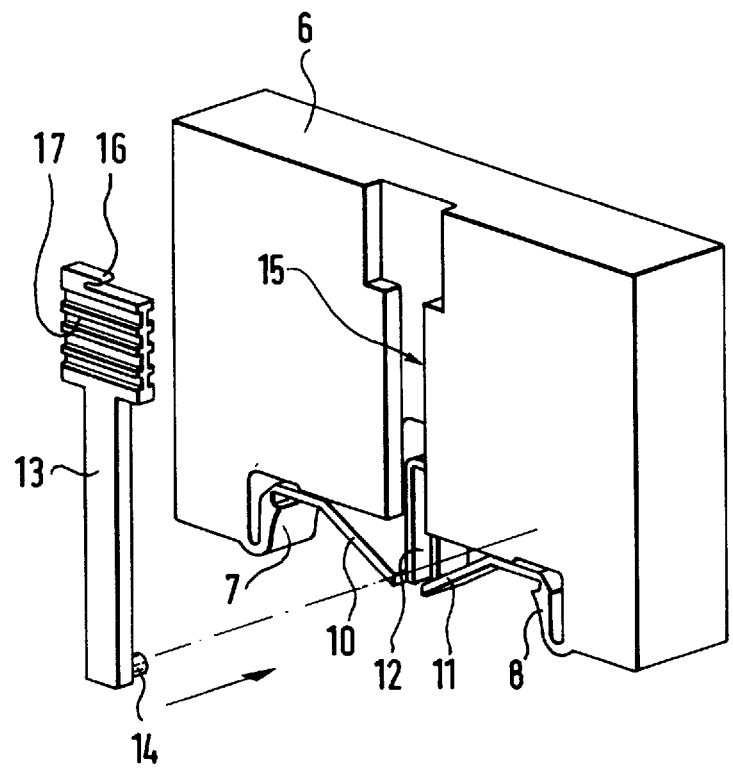
FIGS. 1 and 2 show in a perspective representation the structural design of the unlock device.

By comparison of FIGS. 1 and 2, it can be seen that a pulling rod 13, which is molded of insulating material and is shown in FIG. 1 in a representation by itself, has a collection nub 14 at the lower end, which engages in the retention member 12 as soon as pulling rod 13 is applied from the side into a guide bed 15 formed in insulating material housing 6.

Figure 3:
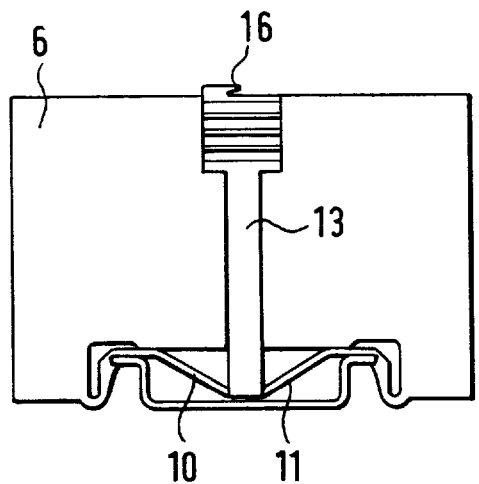
FIGS. 3–5 show functional representations of the unlocking device according to FIGS. 1 and 2.
Figure 4:
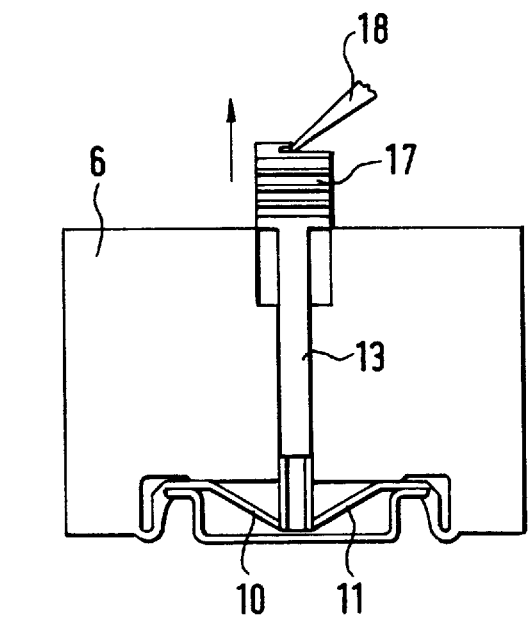

Pulling rod 13 is found in the recessed arrangement, which is shown in FIG. 3, in the rest position of the actuator. In the recessed arrangement, only one small engagement hook 16 is present on the upper side of the insulating material housing, the hook serving the purpose of allowing a gripping stick 17 to be pulled out from its recess by means of a tip 18 of a screwdriver or the like. Upon moving the gripping stick upwardly, the collecting nub 14 of pulling rod 13 slides up to the upper end of retention member 12, without exercising a pulling force on actuator ends 10, 11. This position is shown in the functional drawing according to FIG. 4.

Figure 5:
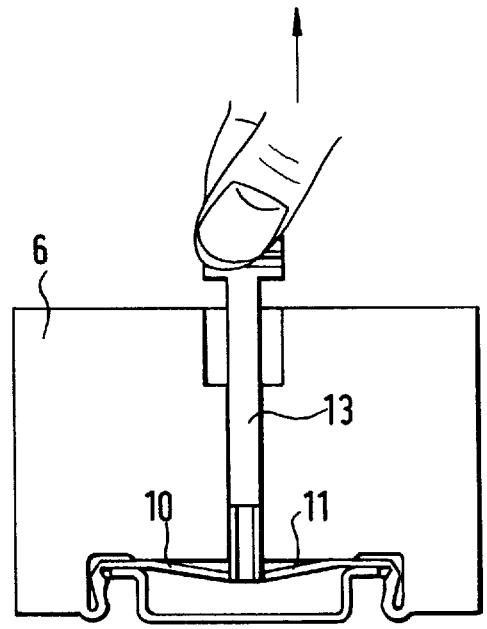

As soon as gripping stick 17 of pulling rod 13 is manually grasped, as shown in FIG. 5, the pulling rod 13 is pulled toward the top. In this way, actuator ends 10, 11 are moved from their rest position (FIGS. 3 and 4) into their operating position (FIG. 5) in which the actuator has an essentially flatter arching, so that ends 10 and 11 in this operating position press locking feet 7 and 8 out from the outer flange edges of assembly rail 9 thereby disengaging the actuator from the assembly rail.

Insulating material housing 6 or the clamp, the module, the installation device or the like may then be removed from the assembly rail vertically upward in the desired position.

What is claimed is:

1. A housing for an electrical apparatus, the housing being releasably attachable to a carrier rail, the carrier rail having a symmetrical cross-section with first and second opposed outwardly extending flanges, said housing comprising:

first and second resiliently deflectable feet integrally molded with the housing at an underside of the housing, said first resiliently deflectable foot being engageable with said first outwardly extending flange and said second resiliently deflectable foot being engageable with said second outwardly extending flange;

an actuator having a connection element, a first finger and a second finger, said first and second fingers being coupled together through said connection element at proximal ends thereof, said first finger having a distal end coupled to said first resiliently deflectable foot, said second finger having a distal end coupled to said second resiliently deflectable foot, said actuator being movable between a first position and a second position, wherein, in said first position, said proximal ends of said first and second fingers are spaced from said underside of said housing and said distal ends of said first and second fingers are spaced by a first distance, and wherein, in said second position, said proximal ends of said first and second fingers are adjacent to said underside of said housing and said distal ends of said first and second fingers are spaced by a second distance, said second distance being greater than said first distance, such that, when said actuator is moved from said first position to said second position, said distal ends of said first and second fingers respectively urge said first and second resiliently deflectable feet outwardly from said first and second outwardly extending flanges of said carrier rail, thereby disengaging said first resiliently deformable foot from said first outwardly extending flange and disengaging said second resiliently deformable foot from said second outwardly extending flange; and a pulling element disposed in said housing for moving said actuator from said first position to said second position, said pulling member being selectively releasably connected to said connection member of said actuator.

2. The housing of claim 1, said pulling element being disposed within a recess formed in said housing, said pulling element including a gripping end provided at an upper end thereof.

3. The housing of claim 2, wherein said connection element comprises a retention member which couples said proximal ends of said first and second fingers together, and wherein said pulling element interfaces with said retention member to move said actuator between said first position and said second position.

* * * * *